United States Patent
Hill et al.

(10) Patent No.: US 12,508,030 B2
(45) Date of Patent: Dec. 30, 2025

(54) APPARATUS AND METHODS FOR CLOSING VESSELS

(71) Applicant: VENOVATION INC., Santa Clara, CA (US)

(72) Inventors: Bradley B. Hill, Santa Clara, CA (US); James Hong, Sunnyvale, CA (US); Tejas Mazmudar, Palo Alto, CA (US)

(73) Assignee: VENOVATION INC., Santa Clara, CA (US)

( * ) Notice: Subject to any disclaimer, the term of this patent is extended or adjusted under 35 U.S.C. 154(b) by 226 days.

(21) Appl. No.: 18/519,038

(22) Filed: Nov. 26, 2023

(65) Prior Publication Data
US 2025/0169823 A1   May 29, 2025

(51) Int. Cl.
*A61B 17/12* (2006.01)
*A61B 17/122* (2006.01)
*A61B 17/128* (2006.01)
*A61B 18/14* (2006.01)

(52) U.S. Cl.
CPC .. *A61B 17/12109* (2013.01); *A61B 17/12031* (2013.01); *A61B 17/1227* (2013.01); *A61B 17/1285* (2013.01); *A61B 18/1477* (2013.01); *A61B 2017/12095* (2013.01)

(58) Field of Classification Search
CPC ........ A61B 17/12109; A61B 17/12031; A61B 17/122; A61B 17/1227; A61B 17/1285; A61B 18/1477; A61B 18/1492; A61B 2017/12095
See application file for complete search history.

(56) References Cited

U.S. PATENT DOCUMENTS

| | | | |
|---|---|---|---|
| 10,548,610 B2* | 2/2020 | Hill | A61B 17/1285 |
| 11,324,514 B2* | 5/2022 | Hill | A61B 17/12031 |
| 11,627,969 B2* | 4/2023 | Hill | A61B 17/122 606/158 |
| 12,357,319 B2* | 7/2025 | Hill | A61B 17/1227 |
| 2015/0201947 A1* | 7/2015 | Hill | A61B 17/12145 606/157 |
| 2020/0170644 A1* | 6/2020 | Hill | A61B 17/122 |
| 2020/0178980 A1* | 6/2020 | Hill | A61B 17/12109 |
| 2022/0330945 A1* | 10/2022 | Hill | A61B 17/12031 |
| 2025/0169823 A1* | 5/2025 | Hill | A61B 18/1492 |

* cited by examiner

*Primary Examiner* — Ryan J. Severson
(74) *Attorney, Agent, or Firm* — William A. English; Vista IP Law Group LLP

(57) ABSTRACT

Apparatus and methods are provided for closing a tubular structure within a patient's body, e.g., a varicose vein. In one example, the apparatus includes an outer member including a cannula and an inner member carrying a pusher member slidably received within a lumen of the cannula. The cannula is inserted into the patient's body into-and-through the vein, the cannula carrying a clip within the lumen including proximal and distal tines in a stressed state and a filament coupled to one of the proximal tines. The inner member is advanced relative to the outer member to advance the pusher member to expose the distal tines from the distal tip beyond the tubular structure, whereupon the distal tines elastically deform towards a relaxed state at least partially around the tubular structure. A release member coupled to the filament is disengaged to disengage the filament from the proximal tine, and the cannula is withdrawn such that the proximal tines are released and elastically deform to at least partially surround and close the tubular structure.

21 Claims, 7 Drawing Sheets

APPARATUS AND METHODS FOR CLOSING VESSELS

RELATED APPLICATION DATA

The present application is related to U.S. Pat. Nos. 10,548,610 and 11,627,969, the entire disclosures of which are expressly incorporated by reference herein.

TECHNICAL FIELD

The present application relates to apparatus, systems, and methods for closing blood vessels or other tubular structures within a patient's body. More particularly, the present application relates to apparatus and methods for closing veins or other tubular structures in a patient's body, e.g., by delivering one or more clips into, through, and/or around the tubular structure.

BACKGROUND

Mild vein-related abnormalities are common and affect most adults. More severe disease with visible varicose veins occurs in up to forty percent (40%) of men and women. Chronic venous insufficiency occurs in about two percent (2%) of the U.S. population and can cause swelling, stasis pigmentation, scarring of the skin and underlying tissues, and skin ulceration in advanced cases. The incidence of all venous disease increases with advancing age.

The causes of varicose vein disease are varied. A family history is common and a genetic predisposition may play a factor. Obstruction of the main draining veins of the leg due to blood clots, called deep venous thrombosis or DVT, and loss of valve function or "valvular incompetence" are the main causes of varicose veins and most forms of venous insufficiency.

Patients with advanced disease are often unable to continue their customary employment, and they may become temporarily or permanently disabled from lack of mobility. The economic and psychological effects can be profound for these patients.

Patients who have varicose veins or more serious forms of venous insufficiency caused by valvular incompetence of the saphenous vein can be managed in a variety of ways. The first line of therapy in most cases is compression therapy and leg elevation. These noninvasive measures can help alleviate symptoms and heal ulcers in some instances. Oftentimes, patients are unable to tolerate tight compression garments and they may not be able to elevate the extremity for an adequate time to relieve symptoms and promote ulcer healing because of work requirements and/or other lifestyle issues.

Invasive treatment methods for disease stemming from valvular incompetence of the saphenous vein include: 1) vein stripping, 2) high-ligation, 3) foam sclerotherapy, and 4) endo-venous ablation. Vein stripping and high-ligation have fallen out of favor because stripping is traumatic and high-ligation is associated with a high recurrence rate. Foam sclerotherapy has not had widespread adoption and is known to cause visual disturbance (scotoma), migraine-like headache, cough, and neurologic deficit (usually transient) in less than two percent (2%) of cases.

In recent years, endo-venous ablation using radiofrequency energy or laser energy has become the preferred treatment for patients who suffer from venous disease due to axial reflux in the long and short saphenous veins and in some cases involving reflux in the perforating veins. However, endo-venous ablation requires tumescent anesthesia and is typically done in an ambulatory surgery setting. Even though the procedure is minimally invasive, some patients experience significant bruising and post-procedural pain, which may last for more than a week. Endo-venous ablation involves destruction of the vein from the inside out along the full length of the treatment segment. The tissue destruction causes pain in the soft tissues after the anesthetic wears off. Some patients require prescription pain medications and often several days off work until the pain has resolved.

Therefore, there is a need for improved systems for treating venous insufficiency caused by valvular incompetence of the saphenous vein.

SUMMARY

The present application is directed to apparatus, systems, and methods for closing a tubular structure, e.g., a blood vessel, such as a saphenous or other vein, to eliminate flow of fluid through the lumen of the tubular structure. In addition, the present application is directed to apparatus, systems, and methods for delivering one or more clips into a patient's body, e.g., percutaneously, to close tubular structures.

The description herein focuses on using various apparatus and methods to close a saphenous vein, e.g., for treatment of valvular incompetence. It will be appreciated that other tubular structures may also be closed using the apparatus and methods described herein. For example, other structures that may be treated include arteries, biliary tubes, bronchial or other airway tubes, or other anatomical structures, including prosthetic tubular grafts, e.g., as are used in vascular bypass operations.

In accordance with one example, an apparatus is provided for closing a tubular structure within a patient's body that includes a tubular outer member comprising a proximal end, a distal end, and defining a longitudinal axis between the proximal and distal ends; a cannula extending distally from the outer member distal end, the cannula including a sharpened tip to allow insertion into tissue through a tubular structure and a lumen extending between the outer member distal end and the tip; a clip loaded in the lumen, the clip compressible between a relaxed state in which a plurality of tines of the clip are shaped to engage and close a tubular structure within a patient's body, and a stressed state in which the tines are compressed to allow the clip to be loaded into the lumen, at least one of the tines including an eyelet; an inner member comprising a distal end slidably received in the outer member, a proximal end extending proximally from the outer member proximal end, and a pusher member fixed to the inner member comprising a first end positioned adjacent the inner member proximal end and a second end slidably received within the lumen of the cannula such that distal advancement of the inner member relative to the outer member causes the second to at least partially expose the clip from the tip of the cannula such that the tines engage a tubular structure through which the tubular member is directed; and a release member comprising a hub removably coupled to the inner member proximal end and a filament extending through the pusher member between the first and second ends into the cannula and passing through the eyelet to prevent the clip from being released when partially exposed from the tip, the hub removable from the inner member proximal end to withdraw the filament from the eyelet and pusher member to allow the clip to be fully deployed from the tip.

Other aspects and features of the present invention will become apparent from consideration of the following description taken in conjunction with the accompanying drawings.

BRIEF DESCRIPTION OF THE DRAWINGS

It is believed the present invention will be better understood from the following description of certain examples taken in conjunction with the accompanying drawings, in which like reference numerals identify the same elements and in which:

In FIGS. 4B and 4C, the orientation of the clip is shown rotated ninety degrees from its actual orientation to show the compressed tines lying within a common plane.

Figure 1A:
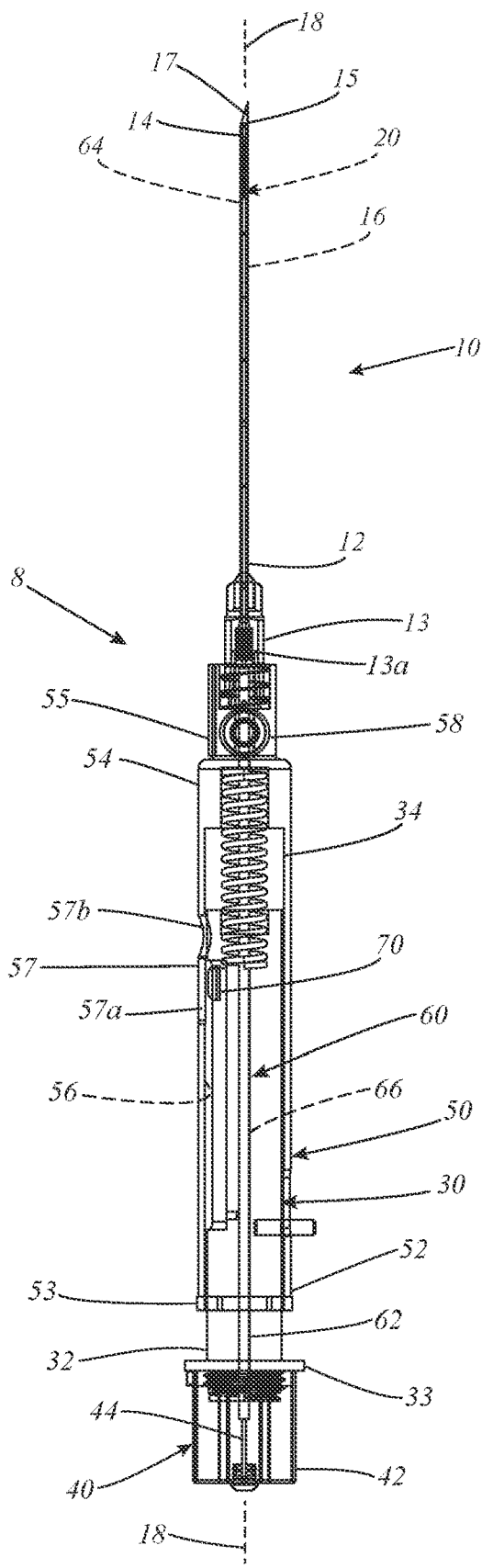
FIGS. 1A and 1B are side views of an example of an apparatus for delivering a clip.

The drawings are not intended to be limiting in any way, and it is contemplated that various examples of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Before the examples are described, it is to be understood that the invention is not limited to particular examples described, as such may, of course, vary. It is also to be understood that the terminology used herein is for the purpose of describing particular examples only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials are now described.

It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Figure 1B:
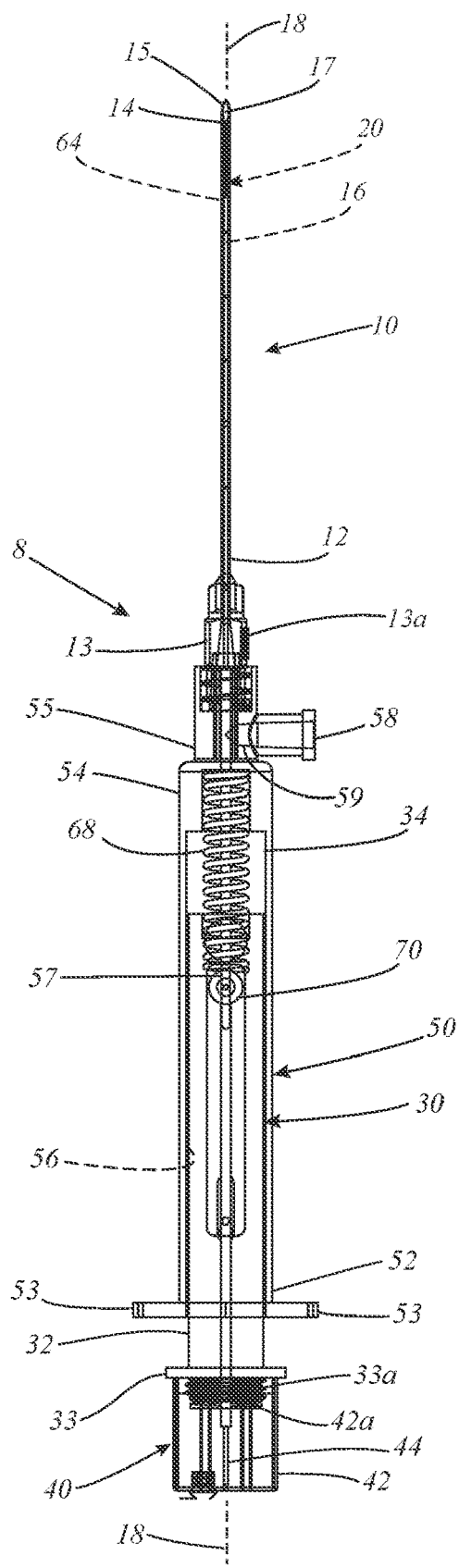

Turning to the drawings, FIGS. 1A and 1B show an example of an apparatus or delivery device 8 for delivering a clip 20 into a patient's body, e.g., to close a tubular structure, such as a saphenous vein or other blood vessel. Generally, the apparatus 8 includes an outer housing or other tubular member 50 including a cannula or needle 10, one or more clips (e.g., clip 10 shown in FIGS. 1C and 3A-3C) carried within the cannula 10, an inner housing and/or pusher member 30, and a release actuator 40, e.g., as shown separately in FIGS. 2A-2C. Optionally, the apparatus 8 may be part of a system, e.g., including one or more other components to facilitate delivering the clip, such as a source of fluid, an ultrasound transducer and/or other imaging device, a needle guide, and the like (not shown).

Figure 2A:
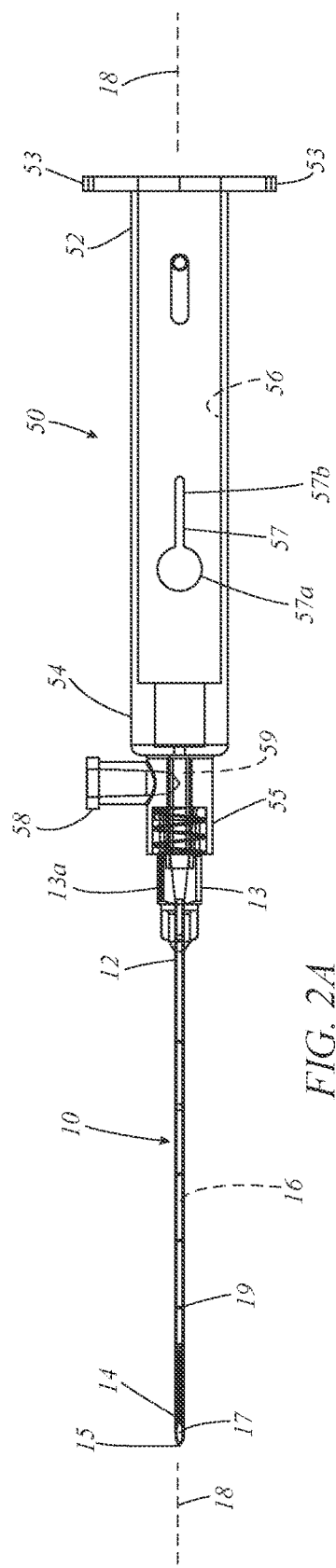
FIGS. 2A-2C are side views of exemplary components that may be included in the apparatus of FIGS. 1A-1C.

Generally, the outer housing 50 is an elongate tubular member including a proximal end 52, a distal end 54, and a chamber 56 extending between the proximal and distal ends 52, 54, e.g., along a longitudinal axis 18 of the device 8. For example, as shown in FIG. 2A, the outer housing 50 may have a shape similar to a conventional syringe barrel, e.g., with an open proximal end 52 to slidably receive the inner housing 30 and a closed distal end 54 including a hub 55 from which the cannula 10 extends. The outer housing 50 may have a substantially uniform, e.g., cylindrical, cross-section between the proximal and distal ends 52, 54, or may have a non-circular cross-section and/or different shaped regions (not shown) between the proximal and distal ends 52, 54, if desired. Optionally, the outer housing 50 may include one or more features to facilitate holding and/or manipulating the device 50, e.g., a pair of finger flanges 53 on the proximal end 52 and/or one or more textured or shaped surfaces (not shown) between the proximal and distal ends 52, 54.

The inner housing 30 is an elongate tubular body including a proximal end 32, a distal end 34 sized to be received within the chamber 56 of the outer housing 50. For example, as shown, the inner housing 30 may have a substantially uniform, e.g., cylindrical, cross-section between the proximal and distal ends 32, 34 slightly smaller than the outer housing 50, such that the inner housing 30 may slide axially within the chamber 56 with minimal lateral movement. Alternatively, the inner housing 30 may have a non-circular cross-section and/or different shaped regions (not shown) between the proximal and distal ends 32, 34, e.g., that correspond to the inner cross-section of the outer housing 50.

Figure 2B:
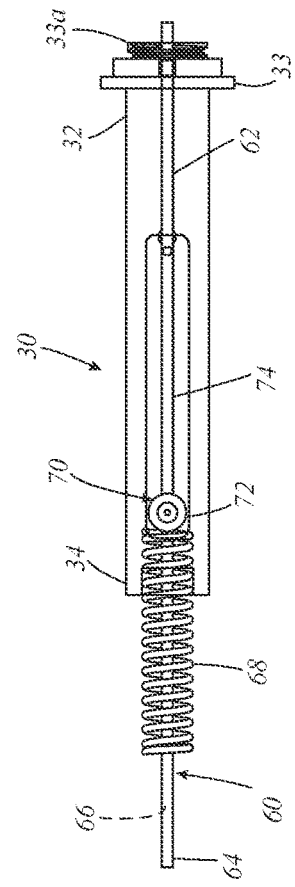

The inner housing 30 may include a hub or flange 33 on the proximal end 32, e.g., to limit axial movement of the inner housing 30 relative to the outer housing 50. For example, when initially provided, the flange 33 may be spaced apart proximally from the proximal end 52 of the outer member 50, e.g., as best seen in FIG. 1B. Thus, in this example, the inner housing 30 may be advanced distally until the flange 33 contacts the proximal end 52 of the outer member, thereby limiting distal advancement. In addition, the flange 33 may include one or more connectors that allow the release member 40 to be removably coupled to the proximal end 32 of the inner housing 30, e.g., one or more threads 33a, as best seen in FIG. 2B.

The inner and outer housings 30, 50 may be formed from the same or different materials, e.g., plastic, metal, glass, or composite materials, as desired, e.g., having sufficient rigidity to support the apparatus 8 during use. Optionally, the inner and/or outer housings 30, 50 may be transparent to allow observation of internal components or may be opaque or translucent, as desired.

Figure 1C:
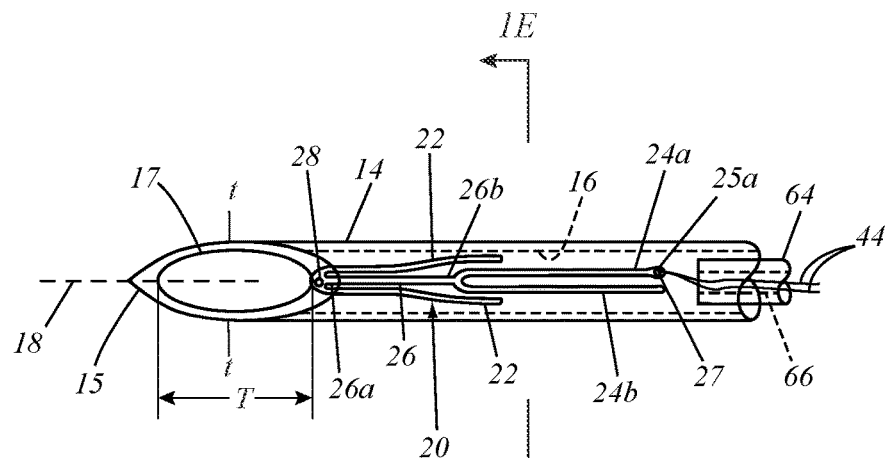
FIGS. 1C and 1D are cross-sectional details showing a clip received within a cannula of the apparatus of FIGS. 1A and 1B.
Figure 1D:
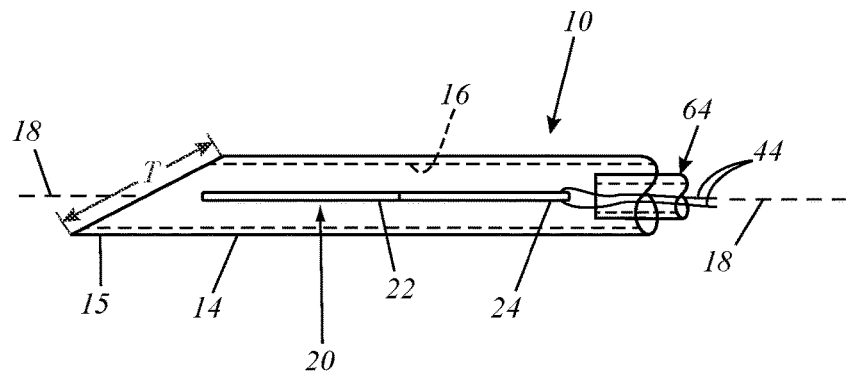
Figure 2C:
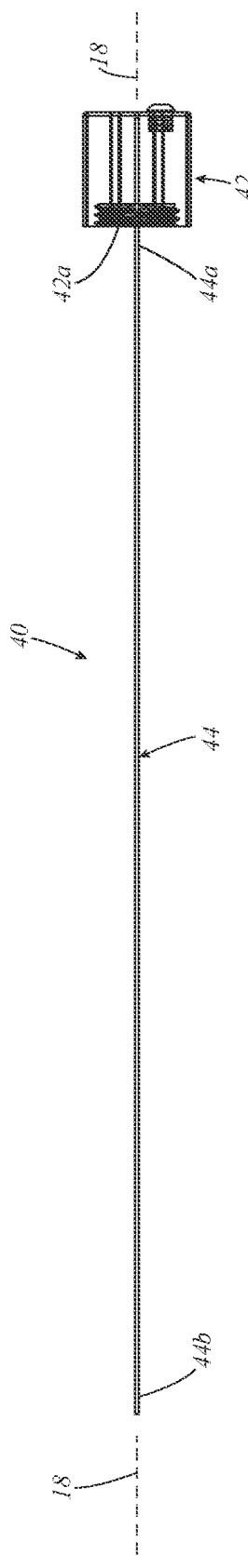

With continued reference to FIGS. 1A and 1B, the cannula 10 may be a substantially rigid tubular body, e.g., a section of hypo-tube formed from stainless steel or other biocompatible material, including a proximal end 12 coupled to the hub 55 on the distal end 54 of the outer housing 50, a distal end 14, and a lumen or slot 16 extending at least partially between the proximal and distal ends 12, 14. The distal end 14 of the cannula 10 may terminate in a beveled, pointed, or other sharpened distal tip 15, e.g., to facilitate percutaneous introduction of the cannula 10 directly through tissue to a target location within a patient's body and includes an outlet 17 communicating with the lumen 16 from which the clip 20 may be deployed, as described further below. For example, as shown in FIGS. 1C and 1D, the distal tip 15 may include a beveled tip that includes an outlet 17 defining an oval shape including and a major axis "T" (running from a proximal-most end of the outlet 17 to a distal-most point of the tip 15) and a minor axis "t" orthogonal to the major axis. Alternatively, the distal end 14 may have a blunt shape (not shown) and the cannula 10 may be directed into tissue through another needle, trocar, or other device (also not shown).

In one example, the proximal end of the cannula 10 may substantially permanently attached to the hub 55 of the outer member 50, e.g., by one or more of bonding with adhesive, sonic welding, interference fit, cooperating connectors (not shown), and the like. Alternatively, as shown in FIG. 2A, the proximal end 12 of the cannula 14 may include a fitting or hub 13, e.g., including a Luer or other connector, that allow the cannula 14 to be removable coupled to the hub 55 on the distal end 54 of the outer housing 50. Optionally, as shown in FIGS. 1A and 1B, the distal end 54 of the outer housing 50 may include a side port 58, e.g., extending laterally from the hub 55, e.g., substantially perpendicular to the axis 18. The side port 58 may communicate with a passage 59 within the distal end 54 that communicates with the lumen 16 of the cannula 10, as described further below.

Optionally, the side port 58 may include a connector, e.g., a Luer connector, threaded connector, and the like, to allow a source of fluid, e.g., a syringe, tubing, and the like (not shown), to be removably connected to the side port 58, e.g., to deliver fluid through the side port 58 into the lumen 16 and/or out the top 15 of the cannula 10. If desired, the side port 58 may include a valve (not shown) to allow the side port 58 to be opened and closed during use. For example, a section of tubing (not shown) may be coupled to the side port 58 that communicates with a syringe (not shown) containing saline or other biocompatible liquid, which may be delivered from the syringe through the tubing and side port 58 into the lumen 16 during use, as desired. Alternatively, a length of tubing may be substantially permanently attached to the side port 58, e.g., by one or more of an interference fit, mating connectors, bonding with adhesive, sonic welding, and the like.

The inner housing 30 also carries a pusher member 60, e.g., an elongate tubular body axially fixed relative to the inner housing 30, e.g., centered on the axis 18. The pusher member 60 includes a first or proximal end 62, which may be positioned adjacent the proximal end 32 of the inner housing 30 and a second or distal end 64 sized to be received within the lumen 16 of the cannula 10. The length of the pusher member 60 may be set such that the second end 64 is initially positioned adjacent a clip 10 received within the lumen 16, e.g., as shown in FIGS. 1C and 1D. Given that the pusher member 60 is axially fixed to the inner housing 30, when the inner housing 30 is advanced distally relative to the outer housing 50, the second end 64 is also advanced distally within the lumen 16, which may be used to partially expose the clip 10, as described further elsewhere herein.

The pusher member 60 may also include a lumen 66 extending between the first and second ends 62, 64 sized to receive a retention wire or other filament 44 of the release actuator 40. For example, as best seen in FIG. 2, the release actuator 40 may include a hub or handle 42 and a first end 44a of the retention wire 44 may be permanently attached to the hub 42, e.g., at a central location aligned with the axis 18, and a second opposite end 44a, which may be free or releasably secured relative to the hub 42 and/or inner housing 30, as described further elsewhere herein.

Alternatively, the pusher member 60 and/or lumen 16 may be sized and/or configured to accommodate the retention wire 44 extending from the hub 42 to the clip 20. For example, the pusher member 30 may be sized smaller than the lumen 16 such that the retention wire 44 may be simply be disposed adjacent the pusher member 60 within the lumen 16 and outside the pusher member 50 within the inner housing 30. Alternatively, one or both of the pusher member 60 and lumen wall may include an axial groove to receive the release wire 44.

Figure 1E:
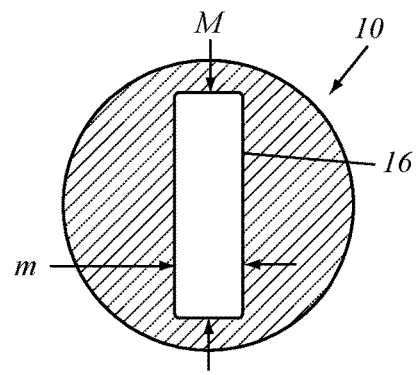
FIG. 1E shows an exemplary cross-section of the cannula of FIG. 1C taken at 1E-1E.

As best seen in FIGS. 1C and 1D, a clip 20 may be loaded within the lumen 16 adjacent the distal end 14 of the cannula 10, and the distal end 64 of the pusher member 60 may be disposed within the lumen 16, e.g., immediately proximal to the clip 20. In one example, the lumen 16 may have a substantially circular cross-section, e.g., similar to a conventional needle. Alternatively, as shown in FIG. 1E, the lumen 16 may have a rectangular shape, an oval shape, or other oblong shape, e.g., including a larger major axis "M"

and a smaller minor axis "m," e.g., such that the clip 20 may be loaded into the lumen 16 in a predetermined orientation about the longitudinal axis 18 of the needle 10. As used herein, "oblong" refers to any cross-sectional shape that includes a major axis that is larger than a minor axis and is configured to slidably receive one or more clips 20 therein while constraining the clip(s) 20 in a stressed state, as described further below. For example, as described further elsewhere herein, the elements of the clip 20 may lie substantially within a plane and the clip 20 may be loaded into the lumen 16 with the plane aligned with the major axis M, e.g., substantially perpendicular to the longitudinal axis 18.

In the example shown in FIGS. 1C and 1D, a single clip 20 is provided within the lumen 16. Alternatively, a cannula may be provided that includes a plurality of clips within the lumen, e.g., spaced apart axially from one another (not shown), such that multiple clips may be deployed sequentially from the cannula.

Generally, each clip 20 includes one or more pairs of tines or extensions thereon for engaging tissue, e.g., a wall of a vein or other tubular structure within a patient's body, as described further elsewhere herein. The clip 20 may be compressible between a relaxed state in which the tines are shaped to engage and/or close a tubular structure within a patient's body, and a stressed state in which the tines are compressed to allow the clip 20 to be loaded into the lumen 16 of the cannula 10. Tips of the tines may have rounded, blunt, bulbous, or other atraumatic shapes, e.g., to allow engagement without penetrating or tearing tissue. Alternatively, the tips of the tines may be sharpened, beveled, barbed, or otherwise configured to facilitate introduction through tissue and/or engagement with the wall of the tubular structure being closed.

Figure 3A:
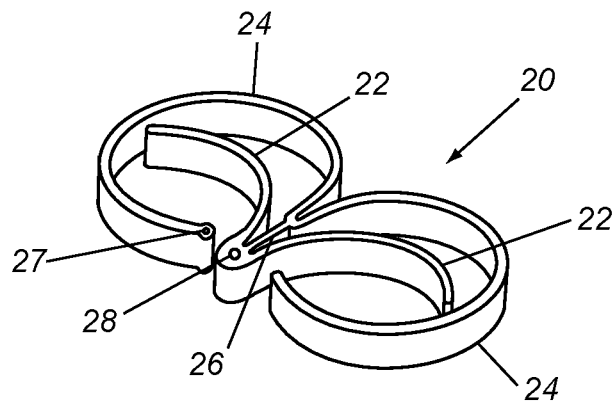
FIGS. 3A-3C are perspective, side, and end views, respectively of exemplary embodiments of an occlusion clip that may be delivered using the apparatus of FIGS. 1A-1C.
Figure 3B:
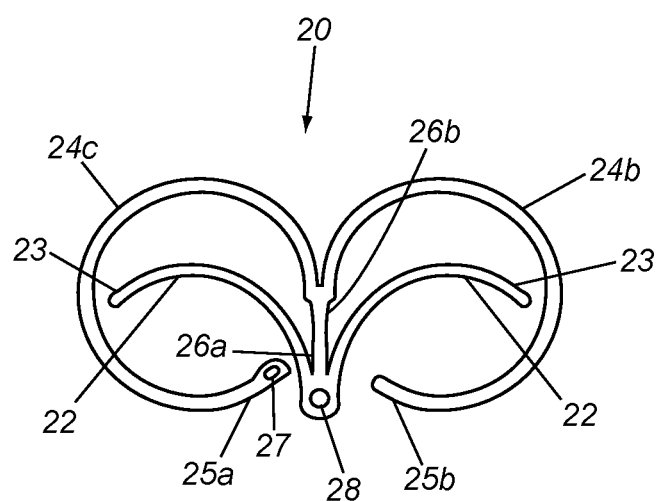
Figure 3C:
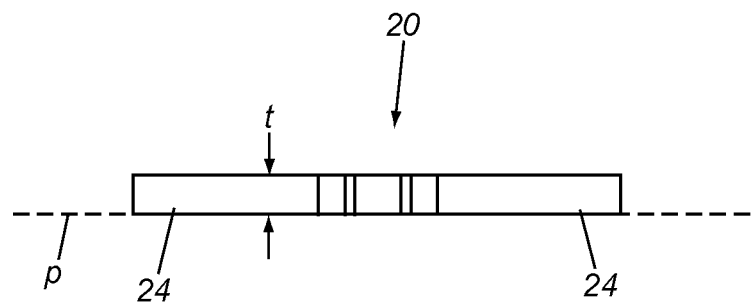

Turning to FIGS. 3A-3C, an example of a clip 20 is shown in a relaxed state that includes two pairs of tines or extensions 22, 24 on opposite ends of an elongate central region 26, all lying within a common plane. As shown, the clip 20 includes a distal set of tines 22 extending from a distal or first end 26a of the central region 26 and a proximal set of tines 24 extending from proximal or second end 26b of the central region 26. In the relaxed state, the distal tines 22 are biased to extend away from one another, e.g., proximally and outwardly from the central region 26, for example, having a curved shape within the plane.

In the relaxed state, the proximal tines 24 define loops that at least partially surround respective distal tines 22 within the plane. As shown, the proximal tines 24 have a length greater than a length of the distal tines 22 such that the proximal tines 24 extend around the distal tines 22 and tips 25 of the proximal tines 24 are disposed adjacent the distal end 26a of the central region 26, e.g., on opposite sides of the distal end 26a. Consequently, tips 23 of the distal tines 22 are disposed within an open region defined within the proximal tines 24. As shown, one of the proximal tines 24a may include an eyelet 27 adjacent a tip 25a thereof. The eyelet 27 may be sized to slidably receive the retention wire 44 (not shown in FIGS. 3A-3C, see, e.g., FIGS. 1C and 1D) to facilitate retention and/or manipulation of the clip 20 during delivery, as described elsewhere herein.

With additional reference to FIGS. 1C and 1D, the clip 20 is configured to be loaded within the lumen 16 of the needle 10 in a stressed state wherein the proximal tines and distal tines are compressed towards one another. For example, as best seen in FIG. 1C, the tines 22, 24 may be substantially straightened and axially aligned with the central region 26 along the axis 18, e.g., with the tines 22, 24 oriented towards proximally within the lumen 16, while remaining within a plane when the clip 20 is loaded within the needle 10. However, once released from the lumen 16, the tines 22, 24 are biased to return automatically back towards the relaxed state, e.g., unfolding within the plane.

As shown in FIGS. 1C and 1D, the clip 20 may be aligned relative to a beveled tip 15 of the cannula 10 to facilitate orienting the clip 20 during deployment, as described further elsewhere herein. For example, as shown, the clip 20 may be oriented radially within the lumen 16 along the axis 18 such that the tip 15 of the cannula 20 is on one side of the plane defined by the clip 20, i.e., such that the plane of the clip 20 is aligned with the minor axis "t" of the outlet 17. Thus, when the distal tins 22 are initially deployed, the distal tines 22 may expand and be positioned on either side of the beveled tip 15, e.g., with the plane aligned with a minor axis "t" of the outlet 17. Further, if the clip 20 rotates out of this alignment during initial deployment, when the clip 20 is pulled proximally, e.g., as described further elsewhere herein, the deployed distal tines 22 may slide along the tip 15 to rotate the clip 20 to position the distal tines 22 on either side of the tip 15, e.g., as shown in FIG. 4D.

Alternatively, if an oblong lumen is provided, e.g., as shown in FIG. 1E, the thickness of the clip 20 may be slightly less than the minor dimension "m" of the lumen 16, and the width of the tines 22, 24 and central region 26 within the plane may be slightly less than the major axis "M." Given the relative dimensions, the clip 20 may be slidably received in the lumen 16 with the tines 22, 24 maintained in the stressed state within the plane by the walls of the lumen 16. Optionally, the lumen 16 may provide sufficient clearance around the clip 20 to allow fluid to be delivered through the lumen 16 with the clip 20, or the lumen 16 include a longitudinal groove (not shown), e.g., in a wall of the major dimension to provide a path for fluid to travel through the lumen 16.

In accordance with one example, the central region 26 may have a length between about one and four millimeters (1-4 mm), the distal tines 22 may have a length between about two and eight millimeters (2-8 mm), and the proximal tines 24 may have a length between about four and twelve millimeters (4-12 mm) (but longer than the distal tines 22). For example, the proximal tines 24 may have sufficient length to at least partially or entirely surround the outer wall of a vessel being occluded, e.g., a vein having a diameter between about four and fifteen millimeters (4-15 mm).

The clip 20 may be formed from an elastic or superelastic material, e.g., metal such as Nitinol or plastic, such that the tines 22, 24 may be compressed to facilitate loading the clip 20 into the needle 10 and resiliently biased towards the relaxed state to surround, penetrate, and/or otherwise engage a wall of a tubular structure and/or surrounding tissue to close the tubular structure. Alternatively, the clip 20 may be formed from shape memory material, e.g., that may be loaded into the needle 10 in a first state, e.g., a martensitic state at a first temperature below body temperature, and may be deployable from the needle 10 in a second state, e.g., an austenitic state at body temperature in which the clip 20 may remember an engagement shape for closing the tubular structure. For example, the clip 20 may be cut or otherwise formed from a sheet of Nitinol or other superelastic metal, e.g., by laser cutting, stamping, machining, and the like, and heat treated and/or otherwise processed to set the shape of the relaxed state.

During assembly, the second, free end 44b of the retention release wire 40 may be directed through the lumen 66 of the pusher member 60 from the proximal end 62 to the distal end 64, then passed through the eyelet 27 of the clip 20, and then directed back through the lumen 66 to the proximal end 62. The second end 44b of the retention wire 44 may then be releasably secured to the hub 42 and/or proximal end 32 of the inner housing 30. For example, the second end 44b may be engaged between the threads 33a, 42a of the inner housing 30 and hub 42 when the hub 42 is threaded onto the flange 33 of the inner housing 30 to prevent subsequent movement of the second end 44b. In this example, when the hub 42 is unthreaded from the flange 33, the second end 44b may be released, thereby allowing the retention wire 44 to be pulled through the lumen 66 of the pusher member 60 to remove the wire 44 from the eyelet 27 and release the clip 20, as described further elsewhere herein.

Alternatively, one or both ends of the retention wire 44 may be coupled to an actuator (not shown), e.g., on the hub 42 or flange 33 to allow manipulation and release of the retention wire 44 during use, as described further below.

Optionally, the apparatus 8 may include one or more additional features to facilitate use of the apparatus 8 during a procedure. For example, if desired, one or more visual markers and/or other features (not shown) may be provided at desired locations around the periphery of the hub 42 and/or the outer housing 60, e.g., to provide a visual indication of the orientation of the clip 20 within the lumen 16 of the cannula 10. For example, as shown in FIG. 2, a marker 13a may be provided on one side of the cannula hub 13, which may identify the orientation of the beveled tip 15, e.g., to identify when the minor axis "t" of the tip 15 is oriented vertically, and/or the narrower, minor axis of the lumen 16 (shown in FIG. 1E), e.g., such that the plane of the clip 20 is oriented vertically when the surface of the marker 13a is oriented horizontally (or positioned anteriorly when the device 8 is rotated). In addition or alternatively, the hub 42 may have an oblong shape, e.g., such that a major axis of the hub 42 is ninety degrees offset around the axis 18 from the minor axis "t" of the tip 15 or the major dimension of the oblong lumen 16.

Optionally, the apparatus 8 may include a removable stop, e.g., disposed around the proximal end 32 of the inner housing 30, e.g., between the proximal ends 32, 62 of the inner and outer housings 30, 60 that prevents the inner housing 30 from being advanced distally until the stop is removed. For example, the stop may be a "C" shaped collar or other element (not shown) that extends at least partially around the inner housing 30 and has a predetermined length to limit advancement of the inner housing 30.

Once the stop is removed, the inner housing 30 may be advanceable to direct the second end 64 of the pusher member 60 distally to at least partially expose the clip 20, e.g., to deploy the distal tines 22 of the clip 20 from the lumen 16 beyond the distal tip 15 while the proximal tines 24 remain within the lumen 16. For example, the inner housing 30 may be advanced until the flange 33 abuts the proximal end 62 of the outer member 60.

Optionally, the inner and/or outer housings 30, 50 may include one or more features to provide tactile feedback during advancement of the inner housing 30. For example, as shown in FIG. 2, a spring or other resilient member 68 may be provided on the inner housing 30, e.g., extending distally from the distal end 34 of the inner housing 30. In the example shown, the resilient member 68 is a coil spring disposed concentrically around the pusher member 60 and extends towards the distal end 54 of the outer member 60 within the chamber 56. Consequently, when the inner housing 30 is advanced distally, the resilient member 68 may be compressed, thereby providing increasing resistance to further advancement until the flange 33 of the inner housing 30 prevents further advancement.

The resilient member 68 may provide tactile feedback to the user and/or may provide a safety feature. For example, when the inner housing 30 is advanced, e.g., by pushing distally on the hub 42, the pusher member 60 is directed distally such that the second end 68 begins to advance the clip 20 within the cannula lumen 16 towards the outlet. If the user released the inner housing 30, e.g., stops pushing on the hub 42, the resilient member 68 may automatically retract the pusher member 60, thereby preventing further advancement of the clip 20 and providing a gap between the second end 64 of the pusher member 60 and the clip 20.

The resilient member 68 may also facilitate aligning the clip 20 during deployment. For example, as described further elsewhere herein, when the distal tines 22 are deployed from the beveled tip 15, the resilient member 68 may bias the inner housing 30 to move proximally, thereby pulling the retention wire 44 and, consequently, the clip 20 proximally relative to the cannula 20, e.g., as shown in FIG. 4D. If the distal tines 22 are not already aligned along the minor axis "t" of the outlet 17, the distal tines 22 may slide along the edges of the tip 15 as the clip 20 is pulled proximally, thereby causing the clip 20 to rotate as necessary to rotationally align the distal tines 22 with the minor axis "t".

In addition or alternatively, the resilient member 68 may cooperate with a guide track on the inner and/or outer housings 30, 50 to limit movement of the inner housing 30. For example, as best seen in FIG. 2, the outer housing 5 may include a slot or other track 57 in its sidewall, e.g., extending along the axis 18 and including a proximal region 57a and a distal region 57b, and the inner housing 30 may include a locking member 70 that may interact with the track 57. For example, as shown in FIGS. 1A and 1B, the locking member 70 may include a button 72 on a resilient stem 74 that is initially disposed within the outer housing 50. The distal region 57b of the track 57 may include an opening larger than the button 72 and the proximal region 57a may include a relatively narrow slot larger than the stem 74.

Consequently, when the inner housing 30 is advanced, the button 72 may slide along the inner surface of the outer housing 50, e.g., within a recess 74 in the inner housing 30, until the button 72 becomes aligned with the distal region 57b. When this occurs, the stem 74 may bias the button 72 to move radially outwardly through the distal region 57b outside the outer housing 50. If the inner housing 30 is released, the resilient member 68 may automatically direct the inner housing 30 proximally, thereby causing the locking member 70 move proximally, resulting in the stem 74 sliding into the proximal region 57a of the track 57 until the stem 74 reaches the end of the track 57, thereby limiting further proximal movement of the inner housing 30. Given the larger size of the button 72, the locking member 70 cannot be pushed back into the outer housing 50 unless the button 72 is advanced distally to the distal region 57b, whereupon the button 72 may be pushed inwardly, if desired.

Optionally, the cannula 10 may include one or more electrodes (not shown) on or adjacent the distal tip 15. For example, the shaft of the cannula 10 may be insulated except for a predetermined length adjacent the distal tip 15, which may be coupled to one or more internal wires or other conductors (not shown) extending to the proximal end of the apparatus 8, e.g., to a connector (not shown) on the hub 33 of the inner housing 30. Alternatively, separate electrodes (also not shown) may be attached or otherwise mounted around the distal end 14 of the cannula 10, which may be coupled to wires or conductors on or within the cannula 10 and/or inner housing 30. In this option, a source of electrical energy, e.g., an electrocautery generator (not shown), which may be provided, which may be coupled to the apparatus, e.g. a connector on the hub 33 via one or more wires or cables (also not shown). Optionally, the apparatus 8 may include a grounding pad (not shown) also coupled to the generator, which may be placed against the patient, e.g., electrically coupled to the patient's skin using known methods. An example of a generator and/or system that may be used may be found at http://www.boviemedical.com/products_aaron950.asp, the entire disclosure of which is expressly incorporated by reference herein.

Figure 4A:
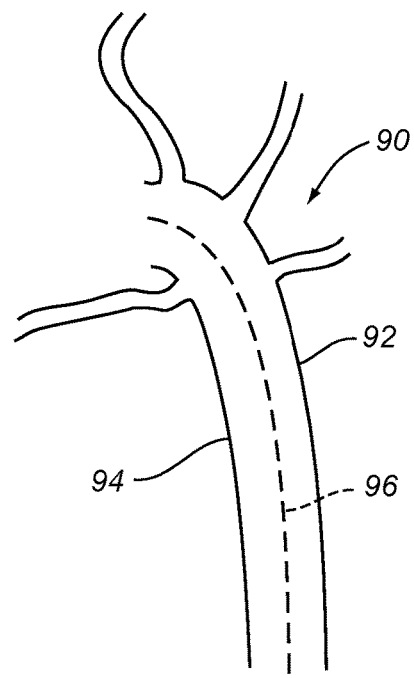
FIGS. 4A-4G are cross-sectional views of a patient's body, showing an exemplary method for closing a blood vessel using the apparatus of FIGS. 1A-1C.
Figure 4B:
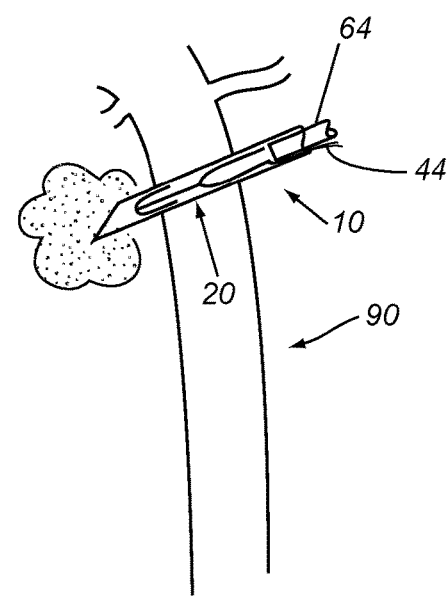
Figure 4C:
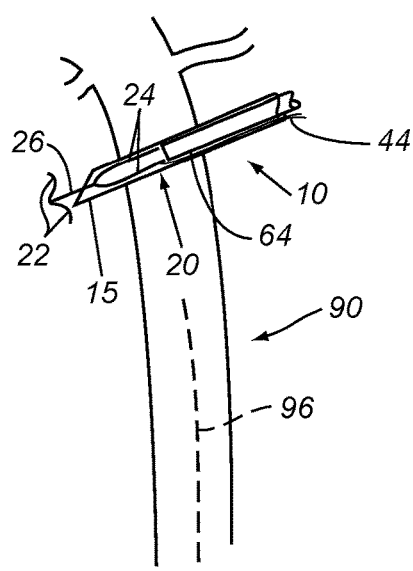
Figure 4D:
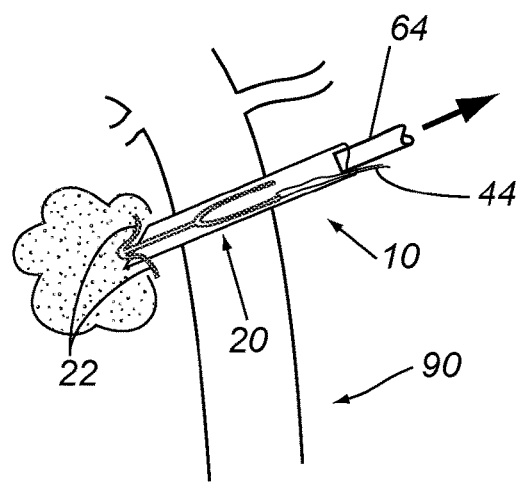

Turning to FIGS. 4A-4G, an exemplary method is shown for using the apparatus 8 of FIGS. 1A and 1B. Initially, as shown in FIG. 4A, a location along a vein or other body lumen 90, e.g., an anterior side 92 of the vein 90 closest to the skin (not shown), may be identified as a target location for delivering a clip 20, e.g., a saphenous vein experiencing valvular incompetence and the like. Optionally, a mark (not shown) may be applied to the patient's skin above the target location, e.g., to identify a point of entry for the cannula 10. A local anesthetic may be injected or otherwise delivered to the skin and/or underlying tissue, e.g., between the skin and vein and/or around the vein, optionally, using the cannula 10, as described elsewhere herein.

Figure 1F:
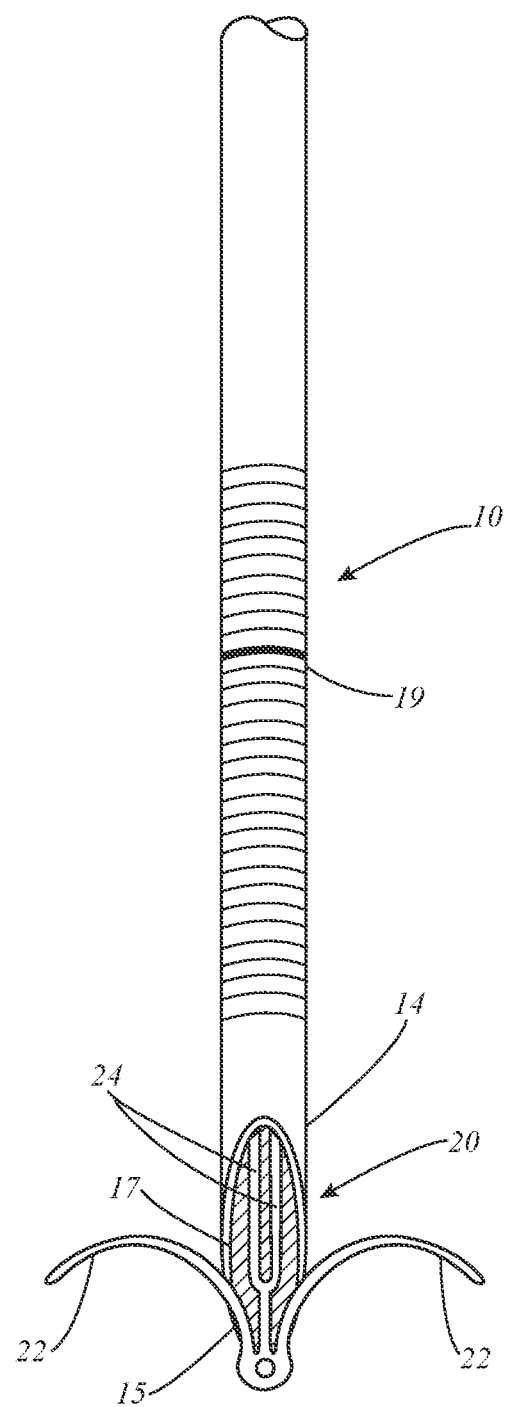
FIG. 1F is a detail showing a distal tip of the cannula of FIGS. 1C and 1D with distal tines of the clip deployed from the outlet.

Turning to FIG. 4B, the cannula 10 may be inserted through the skin and the point of entry and passed into-and-through the vein 90 such that the tip 15 is disposed on a posterior side 94 of the vein 90, e.g., using ultrasound visual control. Optionally, the distal end 14 of the cannula 10 may include one or more features, e.g., a series of annular ribs 14a as shown in FIG. 1F and/or other textures (not shown), extending along a portion of the cannula 10 adjacent the distal tip 15, which may enhance observation of the cannula 10 using ultrasound or other external imaging. The distal tip 15 of the cannula 10 may be positioned beyond the posterior or inner wall 94 of the vein 90, e.g., about one or two millimeters (1-2 mm) deep beyond the posterior wall 92 of the vein 90. Note that the orientation of the clip 20 is shown rotated ninety degrees (90°) about longitudinal axis 18 from its actual orientation to show the compressed tines 22, 24 lying within a common plane.

Optionally, as shown in FIG. 4B, fluid may be delivered through the cannula 10, e.g., from a syringe or other source (not shown) coupled to the side port 58, thereby delivering the fluid through the lumen 16 and out the distal tip 15, into the region adjacent the vein 90. Such fluid may direct tissue surrounding the tubular structure away from the outer wall of the vein 90 and/or create a working space around the vein 90 to accommodate deployment of the distal tines 22. For example, the fluid may simply be saline, or may include an anesthetic with vasoactive agent, such as lidocaine with epinephrine, which may be injected around the vein 90 to induce small muscle contraction or vasospasm, e.g., causing the vein 90 to contract around the cannula 10 after being pierced through the vein 90. Optionally, such fluid may be delivered into the region adjacent the vein 90, e.g., at one or more times during the procedure.

In addition or alternatively, if the cannula 10 includes one or more electrodes, after the cannula 10 is directed through the vein 90 (before or, alternatively, after deploying the clip 20), the generator may be activated to deliver electrical energy, e.g., sixty Watts (60 W) of coagulation energy, to the electrode(s) to cauterize the vein 90 and/or otherwise contract the vein 90 around the distal end 14 of the cannula 10. For example, if the cannula 10 is insulated along its length except for an electrically conductive distal region, e.g., a one to two centimeters (1.0-2.0 cm) length adjacent the distal tip 15, the conductive region may be positioned across the vein 90 and electrical energy delivered from the generator to the contacted tissue. The uninsulated region may concentrate the electrical current at the distal end 14 of the cannula 10 where the cannula 10 traverses the vein 90. The electrical current may induce vasoconstriction and/or cause a small segment of tissue destruction along the vein 90 to help ensure complete closure of the vein 90.

For example, the materials of the cannula 10, pusher member 70, and clip 20 (e.g., stainless steel, Nitinol, and the like) may all conduct electricity to the uninsulated region, which will energize the tissue, cause heat generation, tissue destruction, and tissue contraction to permanently close off the lumen of the vein 90 being treated. Such cautery may be particularly useful in the setting of a bleeding artery or vein caused by trauma or surgical dissection.

The orientation of the clip 20 may be checked, e.g., using one or more markers or other features, such as marker 13a on the cannula hub 13. For example, the cannula 10 may be rotated about the longitudinal axis 18 to ensure that the tines 22, 24 of the clip 20 are oriented across the width of the vein 90, e.g., with the minor axis "t" of the outlet 17 and the plane of the clip 20 substantially perpendicular to the longitudinal axis 96 of the vein 90.

The inner housing 30 may be advanced until the distal tines 22 of the clip 20 exit the distal tip 15 of the cannula 10, whereupon the distal tines 22 may expand automatically towards their relaxed state, as shown in FIG. 4C. For example, the inner housing 30 may be advanced until the flange 33 contacts the proximal end 52 of the outer housing 50 or is otherwise limited to a position where the central region 26 and proximal tines 24 remain within the lumen 16. Optionally, anesthetic with vasoactive agent or other fluid may be delivered into the region adjacent to the vein 90, e.g., just before deployment of the distal tines 22, as shown in FIG. 4B.

Turning to FIG. 4D, once the distal tines 22 are exposed and expanded, the orientation of the clip 20 may be confirmed visually, e.g., using the marker 13a to ensure the distal tines 22 are positioned on either side of the vein 90. For example, as described previously, the clip 20 may be loaded into the cannula 10 such that the plane of the clip 20 is aligned with the minor axis "t" of the outlet 17 in the tip 15, e.g., as shown in FIGS. 1C and 1D. Thus, the orientation of the clip 20 may be confirmed before further manipulation of the device 8.

Optionally, the apparatus 8 may automatically reorient the clip 20, e.g., if the distal tines 22 are deflected by tissue and/or the clip 20 is somehow rotated during release of the distal tines 22. For example, during release of the distal tines 22, if the clip 20 is rotated relative to the axis 18 of the cannula 10, the resilient member 68 may automatically retract the clip 20 to rotate and properly align the distal tines 22 (and consequently the plane of the clip 20), e.g., as shown in FIG. 1F.

For example, after the inner housing 30 is advanced to deploy the distal tines 22, the inner housing 30 may be released and, due to the bias of the resilient member 68, the inner housing 30 may automatically retract partially relative to the outer housing 50, thereby pulling the retention wire 44 and, consequently, the clip 20 proximally within the cannula 10. This action may cause the distal tines 22 to slidably engage the opposite edges of the beveled tip 15, thereby causing the tines 22 to rotate until the distal tines 22 are oriented along the minor axis "t" of the outlet 17. Thus, the clip 20 may be rotated automatically relative to the outer housing 50 and the marker 13a, thereby aligning the plane of the clip 20 across the vein 90.

Figure 4E:
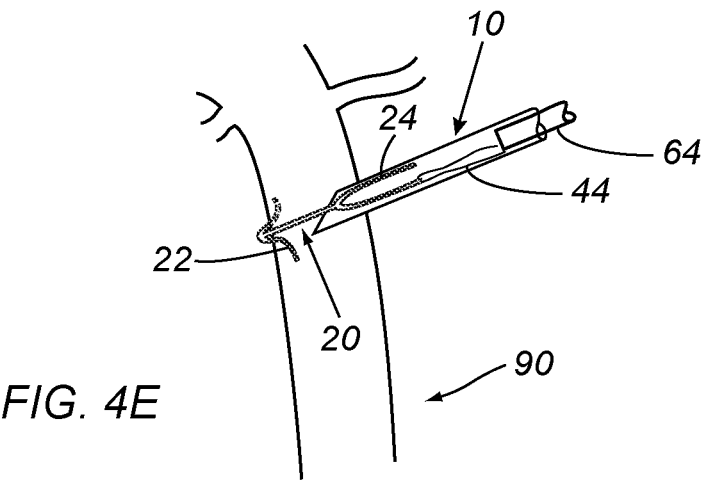

Once the clip 20 is properly oriented, the apparatus 8 may be manipulated e.g., to direct the clip 20 proximally or otherwise to engage the distal tines 22 with the posterior side 94 of the vein 90, e.g., as shown in FIG. 4E. For example, the entire apparatus 8 may be pulled at least partially proximally to engage the distal tines 22 with the posterior wall 94 of the vein 90, e.g., to prevent migration of the clip 20 during subsequent deployment and/or may partially compress or close the vein 90. Optionally, anesthetic with vasoactive agent or other fluid may be delivered into the region adjacent to the vein 90, e.g., after deploying the distal tines 22 and pulling outwardly on the release wire 40. Such fluid may create additional working space around the vein 90, e.g., to accommodate deployment of the proximal tines 24, e.g., as shown in FIG. 4F.

Once the distal tines 22 are engaged as desired with the vein 90, the release actuator 40 may be manipulated to remove the retention wire 44 from the eyelet 27 of the proximal tine 24a (not shown in FIG. 4C) to allow full deployment of the clip 20. For example, the hub 42 may be unthreaded from the flange 33 of the inner housing 30, thereby releasing the second end 44b of the retention wire 44. The hub 42 may then be pulled proximally to direct the second end 44b distally through the lumen 66 of the pusher member 60, through the eyelet 27, and back proximally through the lumen 66.

Figure 4F:
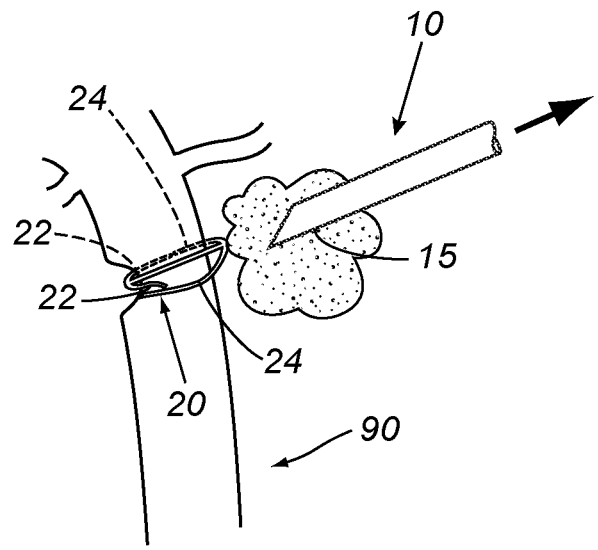
Figure 4G:
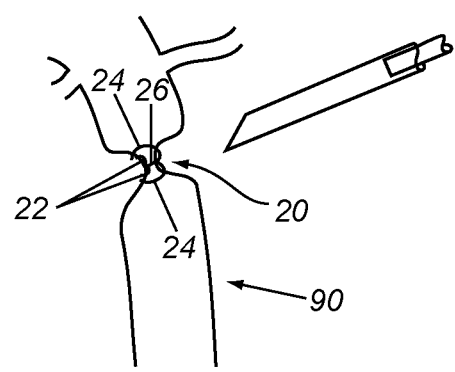

Turning to FIG. 4F, the cannula 10 may then be removed through the vein 90 overlying tissue and skin, thereby deploying the clip 20 fully from the lumen 16. For example, with the distal tines 22 engaged to the posterior side 94 of the vein 90, removing the entire apparatus 8 proximally may cause the proximal tines 24 to exit the outlet 17 and become exposed, whereupon the proximal tines 24 may automatically move towards the relaxed state, e.g., the loop shape shown in FIGS. 3A-3C, thereby at least partially surrounding, compressing, and/or closing the vein 90, e.g., as shown in FIG. 4G.

Optionally, this procedure may be repeated one or more times, e.g., at the same location and/or different locations along the length of the vein 90, to deliver multiple clips (not shown) to close the vein 90.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

We claim:

1. An apparatus for closing a tubular structure within a patient's body, comprising:
   a tubular outer member comprising a proximal end, a distal end, and defining a longitudinal axis between the proximal and distal ends;
   a cannula extending distally from the outer member distal end, the cannula including a sharpened tip to allow insertion into tissue through a tubular structure and a lumen extending between the outer member distal end and the tip;
   a clip loaded in the lumen, the clip compressible between a relaxed state in which a plurality of tines of the clip are shaped to engage and close a tubular structure within a patient's body, and a stressed state in which the tines are compressed to allow the clip to be loaded into the lumen, at least one of the tines including an eyelet;
   an inner member comprising a distal end slidably received in the outer member, a proximal end extending proximally from the outer member proximal end, and a pusher member fixed to the inner member comprising a first end positioned adjacent the inner member proximal end and a second end slidably received within the lumen of the cannula such that distal advancement of the inner member relative to the outer member causes the second to at least partially expose the clip from the tip of the cannula such that the tines engage a tubular structure through which the tubular member is directed; and
   a release member comprising a hub removably coupled to the inner member proximal end and a filament extending through the pusher member between the first and second ends into the cannula and passing through the eyelet to prevent the clip from being released when partially exposed from the tip, the hub removable from the inner member proximal end to withdraw the filament from the eyelet and pusher member to allow the clip to be fully deployed from the tip.

2. The apparatus of claim 1, wherein the tines of the clip comprise a set of proximal tines and a set of distal tines, the tines disposed within the lumen compressed together in the stressed state, the inner member and pusher member movable relative to the outer member and cannula from a first position to a second position wherein the distal tines are exposed from the lumen beyond the distal tip, the distal tines resiliently returning towards the relaxed state to at least partially engage a tubular structure through which the distal end of the tubular member is directed, and wherein one tine of the proximal tines includes the eyelet.

3. The apparatus of claim 2, wherein the filament is removable from the eyelet when the hub is withdrawn to allow the proximal tines to be deployed from the lumen, whereupon the proximal tines resiliently return towards the relaxed state to further engage the tubular structure to close the tubular structure.

4. The apparatus of claim 2, wherein the sharpened tip is beveled such an outlet of the cannula defines an oval shape including a major axis and a minor axis.

5. The apparatus of claim 4, wherein the inner member is biased to move proximally from the second position after the distal tines are exposed, thereby causing the distal tines to slidably engage the beveled tip to automatically orient the clip.

6. The apparatus of claim 5, wherein the proximal and distal tines lie within a common plane in the relaxed state, and wherein the bias of the inner member causes the clip to rotate within the lumen such the plane is aligned with the minor axis of the outlet.

7. The apparatus of claim 5, wherein the bias of the inner member causes the distal tines to automatically position themselves on opposite sides of the bevel.

8. The apparatus of claim 4, further comprising a marker on the outer member identifying an orientation of the beveled tip relative to the longitudinal axis.

9. The apparatus of claim 8, wherein the marker defines a surface configured such that is orthogonal to the minor axis of the outlet.

10. The apparatus of claim 8, wherein the marker defines a surface configured such that, when the outer housing is rotated to position the surface anteriorly, the minor axis of the outlet is oriented vertically.

11. The apparatus of claim 1, further comprising one or more electrodes on the distal end of the cannula configured to deliver electrical energy to tissue adjacent the distal end.

12. The apparatus of claim 11, further comprising one or more conductors electrically coupled between a connector on the proximal end of the inner housing and the one or more electrodes or conductive regions on the distal end to deliver energy from an electrical energy source to the distal end.

13. The apparatus of claim 1, further comprising one or more electrically conductive regions on the distal end of the cannula configured to deliver electrical energy to tissue adjacent the distal end.

14. The apparatus of claim 1, wherein the filament comprises first and second opposite ends and an intermediate region between the first and second ends that is slidably received in the eyelet, the first end permanently attached to the hub, and the second end releasably coupled relative to the hub such that, when the hub is removed from the inner member proximal end and withdrawn, the second end passes distally through the pusher member, through the eyelet, and proximally back through the pusher member to release the proximal tine.

15. The apparatus of claim 1, wherein the hub and the inner member proximal end comprises cooperating threads that secure the hub to the inner member proximal end until the hub is rotated to disengage the threads.

16. The apparatus of claim 1, further comprising a spring extending distally from the inner member distal end within the outer member, the spring configured to compress between the inner member distal end and outer member distal end to provide tactile feedback when the inner member is advanced relative to the outer member.

17. The apparatus of claim 16, wherein:
the outer member comprises a track including a proximal region and a distal region; and
the inner member comprises a locking member disposed within the outer member that passes through the distal region of the track when the inner member is advanced relative to the outer member, the spring causing the locking member to slide into the proximal region when the inner member is released, thereby limiting subsequent proximal movement of the inner member.

18. The apparatus of claim 17, wherein the locking member comprises a button on a resilient element and wherein the distal region of the track has a cross-section larger than the button to allow the button to pass through the distal region out of the outer member and the proximal region has a cross-section smaller than the button that allows the resilient element to slide proximally within the proximal region with the button outside the outer member.

19. The apparatus of claim 1, further comprising a side port on the outer member distal end communicating with the lumen for delivering fluid into the lumen through the side port.

20. A system for closing a tubular structure within a patient's body, comprising:
an apparatus according to claim 1; and
a source of electrical energy.

21. A method for closing a tubular structure within a patient's body, comprising:
providing a delivery device comprising an outer member including a cannula extending from its distal end, and an inner member carrying a pusher member slidably received within a lumen of the cannula;
inserting a distal tip of the cannula into the patient's body into-and-through the tubular structure, the cannula carrying a clip within the lumen including a set of distal tines and a set of proximal tines in a stressed state and a filament coupled to one of the proximal tines;
advancing the inner member relative to the outer member to advance the pusher member partially expose the distal tines of the clip from the distal tip beyond the tubular structure, whereupon the distal tines elastically deform towards a relaxed state at least partially around the tubular structure;
actuating a release member coupled to the filament to disengage the filament from the one of the proximal tines; and
withdrawing the cannula such that the proximal tines are released from the cannula and elastically deform to at least partially surround and close the tubular structure.

\* \* \* \* \*